United States Patent [19]

Stromberg

[11] 4,274,394

[45] Jun. 23, 1981

[54] ELECTROMECHANICAL SOLAR TRACKING APPARATUS

[75] Inventor: Robert P. Stromberg, Albuquerque, N. Mex.

[73] Assignee: The United States of America as represented by the United States Department of Energy, Washington, D.C.

[21] Appl. No.: 30,806

[22] Filed: Apr. 17, 1979

[51] Int. Cl.³ .......................... F24J 3/02; G02B 5/08
[52] U.S. Cl. .................................. 126/425; 350/289; 353/3
[58] Field of Search .............................. 126/424, 425; 250/203 R; 353/3; 350/289, 304; 356/141, 152

[56] References Cited

U.S. PATENT DOCUMENTS

| | | |
|---|---|---|
| 1,951,404 | 3/1934 | Goddard ........................... 126/425 |
| 1,976,428 | 10/1934 | Arthuys et al. ........................... 353/3 |
| 2,712,772 | 7/1955 | Trombe ................. 126/425 |
| 3,982,526 | 9/1976 | Barak ................... 126/425 |
| 4,031,385 | 6/1977 | Zerlaut et al. ...................... 126/425 |
| 4,063,543 | 12/1977 | Hedger ............... 250/203 R |
| 4,082,947 | 4/1978 | Haywood et al. ................. 250/203 R |
| 4,147,414 | 4/1979 | Raser ........................... 353/3 |
| 4,151,408 | 4/1979 | Brown et al. ........................ 126/425 |
| 4,154,221 | 5/1979 | Nelson ................... 126/425 |
| 4,179,612 | 12/1979 | Smith ..................... 126/425 |

Primary Examiner—James C. Yeung
Assistant Examiner—Daniel O'Connor
Attorney, Agent, or Firm—Albert Sopp; Richard G. Besha; James E. Denny

[57] ABSTRACT

The invention relates to an electromechanical solar tracking device which tracks the position of the sun using paired, partially-shaded bimetallic elements.

8 Claims, 2 Drawing Figures

ELECTROMECHANICAL SOLAR TRACKING APPARATUS

BACKGROUND OF THE INVENTION

This invention relates to an electromechanical apparatus for maintaining a solar collector in a desired or optimum orientation with respect to the sun.

Many solar energy collecting devices work most efficiently when positioned generally upwardly, perpendicular to the rays of the sun. Because the position of the sun varies both diurnally and annually, various prior art devices have been used to position the collector, ranging from manual adjustment, clockwork adjustment, thermomechanical adjustment, photoelectric sensors, and combinations of the above.

One example of a photoelectric solar tracker is shown in U.S. Pat. No. 4,041,307. This type of tracker requires relatively sophisticated electronic apparatus to amplify the signals generated by the photoelectric cells before electric motors can operate to steer the collector. Personnel that customarily service and maintain such as home heating and cooling equipment, are generally not trained in the maintenance of electronic gear. As a large market for solar collectors is in home heating and cooling, it would be desirable to make this area of solar technology compatible with existing technology. In addition, in more rural or lesser developed areas of the world, the use of the more sophisticated electronic technology may not be appropriate.

Other solar tracking or heliotropic devices may be direct-acting thermomechanical apparatuses, as shown for example in U.S. Pat. Nos. 3,213,285 and 3,982,526. This class of devices uses the direct action of a heat expansible member to turn a solar collector without the use of electric motors. These may be suitable where only coarse adjustments are necessary but may not be adapted for making the continuous, precise adjustments required in focusing-type solar collectors. In addition, these direct-acting solar trackers would not be capable of producing the large amounts of torque that would be required to steer a a large solar collector that was exposed to the forces of the wind.

The prior art does not teach a simple electromechanical apparatus which will track the sun accurately and without the use of electronic devices or circuitry.

SUMMARY OF THE INVENTION

In view of the difficulties and disadvantages as noted above, it is an object of this invention to provide a novel apparatus for orienting a solar collector towards the sun.

It is a further object of this invention to provide a reliable, inexpensive, and accurate means for tracking the position of the sun.

It is another object of this invention to provide a solar tracker which accurately follows the position of the sun without the use of electronic devices or circuitry.

The apparatus of the invention comprises a pair of bimetallic elements which are equally shaded from the sun when the apparatus is directed toward the sun. When the apparatus is not aligned with the sun, the elements are shaded unequally and flex an unequal amount closing an electrical contact thereby actuating an electric motor to correct the position of the apparatus. Variations in ambient temperature cause an equal but compensating flexing of each strip so that no spurious steering signal is generated.

DESCRIPTION OF THE DRAWINGS

Other objects and advantages of the present invention will be apparent to those skilled in the art from the following description with reference to the appended claims wherein like numbers denote like parts and wherein:

DESCRIPTION OF A PREFERRED EMBODIMENT

Figure 1:
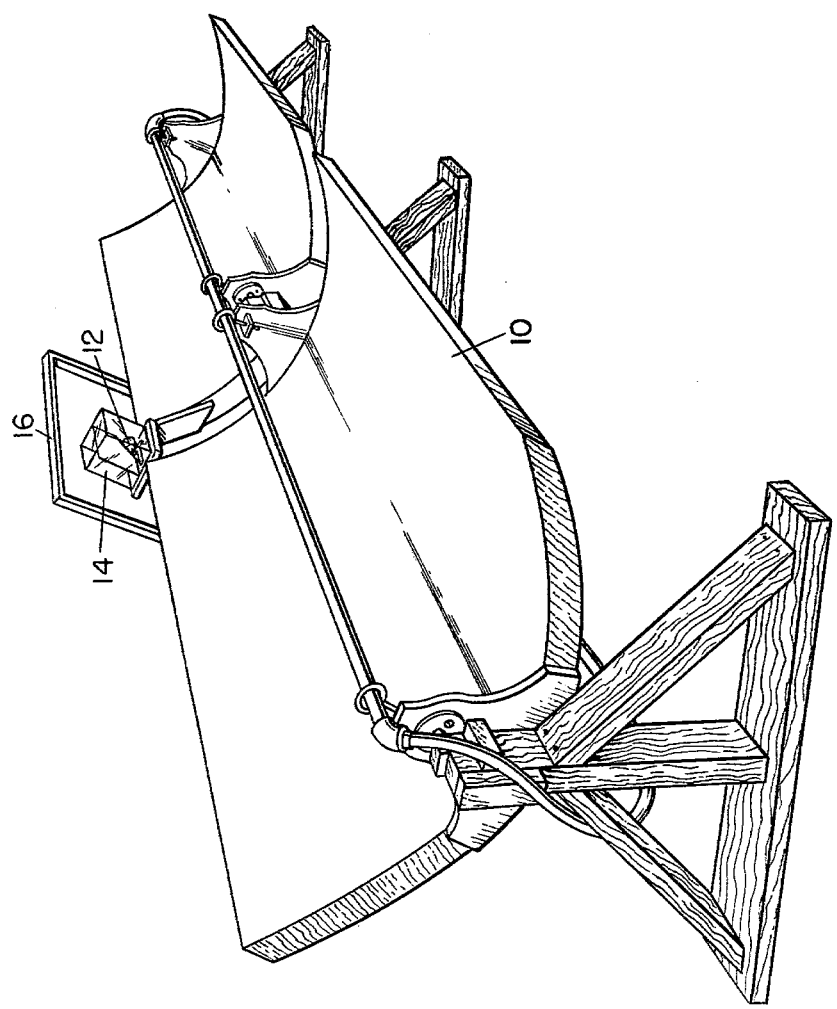
FIG. 1 illustrates the solar tracking apparatus of the present invention mounted on a representative solar collector.

Reference is now made to FIG. 1 which illustrates the solar tracking apparatus 12 of the present invention mounted on a representative solar collector 10. The particular solar collector shown is a simple and rugged parabolic trough concentrator or longitudinal arcuate reflector which focuses solar radiation on a blackened pipe and is suitable for providing hot water for domestic purposes. This collector is steerable about one axis and constructed with the appropriate technology and simplicity that is particularly compatible with that of the present invention. Of course, the use of the present invention is not restricted to this type of collector but could be used with any collector which was movable about at least one axis; e.g., any steerable, flatplate collector, photovoltaic array, or a collector with lenses or mirrors for concentrating the sun's energy.

Also shown are a transparent cover 14 which shields the solar tracker from the cooling effects of the wind which might otherwise cause spurious tracking and a shade bar 16 more fully described hereinafter.

Figure 2:
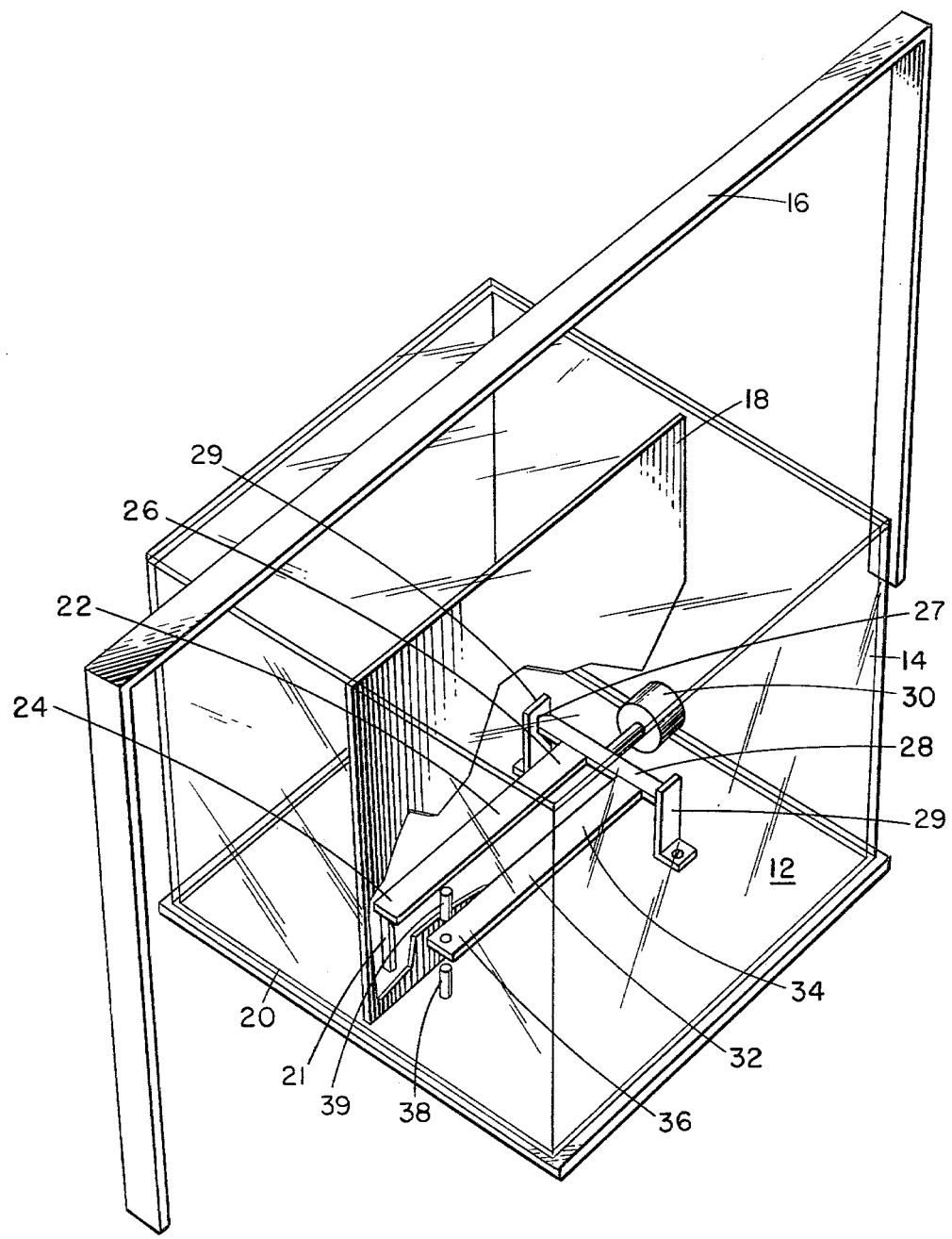
FIG. 2 illustrates the solar tracker in perspective view.

Reference is now made to FIG. 2 which illustrates the solar tracker 12 in perspective view. A base 20 is provided for conveniently mounting the other components of the tracker to a solar collector such that a rotation of the collector causes a corresponding rotation of the tracker. The tracker employs first and second bimetallic strips or elements 22 and 32. A "bimetal" is a device utilizing two pieces of metal having different thermal coefficients of expansion capable of producing a mechanical movement as a function of a variation in temperature. Although these elements are shown as linear, those skilled in the art will recognize that other geometrical arrangements are possible, e.g., a flat spiral, helix or other curvilinear arrangement.

A first or fixed end 24 of first element 22 is held or secured for example by attachment 21 to base 20. Attachment 21 may be flexible to allow the free flexing of element 22 and adjustable as a convenient means for adjusting the setpoint of the apparatus. The second or rotatable end 26 of first element 22 is coupled to member 28, which is supported for rotational motion on opposed pivots 27 (one of which is visible in FIG. 2) between spaced brackets 29. The second element 32 has a first or rotatable end 34 also coupled to rotatable member 28 and a second or free end positioned intermediate a pair of electrical terminals or contacts 38, 39. The bimetallic elements may flex somewhat under the influence of gravity, and this flexing may change as the collector tilts to follow the sun. A counterweight 30 may be coupled with rotatable member 28 for counter-balancing the weight of the bimetallic elements and to compensate for the gravity-induced flexing.

In operation, when elements 22 and 32 are heated to an equal temperature, they will flex by an equal amount. As end 24 is held in position by attachment 21, the flexing of the first strip will be transmitted to the second strip through the rotatable arm 28 so that the flexing of member 32 will cause no movement of its free end 36. If, however, bimetallic strips 22 and 32 are heated to an unequal temperature, the flexing will be unequal and the free end 36 of bimetallic element 32 will make contact with one of electrical contacts 38, 39. By any suitable well-known appropriate electrical wiring, this contact closure may be utilized to operate an electric motor for steering the solar collector in either direction, depending on which contact is closed by free end 36.

The solar tracker employs shade means to provide the equal or unequal heating of the bimetallic elements. A shade plate 18 may be used for "coarse" steering and a shade bar 16 may be used for "fine" steering. The shade plate or screen 18 is situated intermediate the bimetallic strips and generally perpendicular to the base 20. This serves to completely shade one bimetallic strip and allow through illumination of the other when the collector is oblique to the sun. When the collector is close to the desired orientation, the shade plate 18 presents its edge to the sun and no longer casts a shadow on the bimetallic elements, but shade bar 16 then presents a flat area to the sun and does cast a shadow on the elements. When the collector is in substantially the desired orientation, the shade bar casts equal shadows on each bimetallic element, thus allowing equal illumination and equal heating. It will be understood that the shade plate and the shade bar can be incorporated into the same structure and that the shade bar can either be a separate mechanical element or merely an opaque coating on appropriate locations of the cover 14.

The sensitivity of the apparatus is directly proportional to the power level of the sun. Thus, the tracker is most sensitive when the sun is unobscured and least sensitive when the sun is obscured by clouds. The tracker will thus not be "fooled" into falsely tracking the bright edge of a cloud covering the sun. Although the intensity of an early or late sun on an East-West oriented collector is much less than the intensity at solar noon, has been found that for a shade bar formed with a varying width such that the amount of each bimetallic element or strip illuminated varies with the secant of the angle from solar noon, a constant sensitivity will be maintained throughout the day. Such a shade bar mounted 12 inches from the bimetallic elements was found to yield a tracking precision within ±0.6°.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. Apparatus for controlling orientation of a solar collector comprising; a member rotatable about a longitudinal axis thereof; a first bimetallic element having one end fixedly positioned at a first location spaced from said member and another end secured to said member, heat-induced flexing of said first element effecting rotation of said member; a second bimetallic element having one end secured to said member at a position spaced from said first element for movement in response to rotation of the member, heat induced flexing of said second element effecting movement of another end thereof to enhance or cancel the effects of the movement on said end; a pair of electric terminals spaced from opposing sides of the other end of said second element; shade means for selectively exposing said elements to the sun, the elements being equally exposed to the sun when in a desired orientation and unequally exposed to the sun when in an undesired orientation, equal exposure to the sun effecting substantially equal heatings and compensatory flexings of the bimetallic elements, and unequal exposure to the sun effecting substantially unequal heatings and unequal flexings of the bimetallic elements thereby causing contact by the other end of said second element with one said terminals.

2. The apparatus of claim 1 further comprising means for mounting said apparatus on a collector wherein rotation of said collector about an axis causes a corresponding rotation of said apparatus about a parallel axis.

3. The apparatus of claim 1 further comprising means extending from another side of said member for counter balancing the weight of said elements.

4. The apparatus of claim 1 wherein said solar collector is characterized as a longitudinal arcuate reflector steerable about a longitudinal axis thereof and said bimetallic elements are generally parallel to said collector axis and said member is generally perpendicular to said collector axis.

5. The apparatus of claim 1 wherein said bimetallic elements comprise linear strips extending parallel to each other from one side of said member.

6. The apparatus of claim 5 wherein said shade means comprises a generally opaque plate intermediate said elements and perpendicular to the axis of said member, wherein said plate is edgewise to the sun and casts no shadow upon either element when the apparatus is in the desired orientation.

7. The apparatus of claim 6 wherein said shade means further comprises a generally opaque elongate shade bar mounted perpendicular to said plate such that it is bisected lengthwise by the plane of said plate, wherein said bar casts equal shadows over each of said elements only when the apparatus is in the desired orientation.

8. The apparatus of claim 7 wherein the shade bar is formed with a varying width to maintain constant sensitivity on said elements throughout a solar day.

* * * * *